United States Patent [19]

Bolt et al.

[11] 4,396,642
[45] Aug. 2, 1983

[54] HYDROLYTICALLY STABILIZED POLARIZER

[75] Inventors: Lawrence Bolt, Van Nuys; Michael Smith, Thousand Oaks; Ali Tavasolian, No. Hollywood, all of Calif.

[73] Assignee: American Hoechst Corporation, Somerville, N.J.

[21] Appl. No.: 324,505

[22] Filed: Nov. 24, 1981

[51] Int. Cl.³ ............................................. B05D 3/06
[52] U.S. Cl. .................................... 427/54.1; 427/55; 427/163; 427/159.14; 427/229; 427/278; 427/273.3
[58] Field of Search ......................... 427/54.1, 55, 163; 430/20; 204/159.14; 156/229, 272, 278

[56] References Cited

U.S. PATENT DOCUMENTS

| | | |
|---|---|---|
| 2,237,567 | 4/1941 | Land . |
| 2,854,697 | 10/1958 | Ryan . |
| 2,896,262 | 7/1959 | Herrmann . |
| 2,996,956 | 8/1961 | Ryan et al. . |
| 3,058,393 | 3/1958 | Ryan et al. . |
| 3,265,777 | 7/1963 | Marks . |
| 3,370,111 | 2/1968 | Boone . |
| 3,459,839 | 8/1969 | Hutfles ........................... 264/2 |
| 3,621,085 | 11/1971 | Ichikawa . |
| 3,627,579 | 11/1969 | Heffelfinger . |
| 3,900,378 | 8/1975 | Yen et al. .................. 204/159.14 |
| 4,025,688 | 5/1977 | Nagy et al. ...................... 428/350 |
| 4,112,178 | 9/1978 | Brown . |
| 4,166,871 | 9/1979 | Schuler ........................... 427/163 |
| 4,190,418 | 2/1980 | Buzzell . |
| 4,218,280 | 8/1980 | Phillipp et al. ............. 204/159.14 |
| 4,228,574 | 10/1980 | Culley et al. . |

FOREIGN PATENT DOCUMENTS

| | | | |
|---|---|---|---|
| 461140 | 11/1949 | Canada ........................... 427/163 |
| 472835 | 4/1951 | Canada ........................... 427/163 |
| 55-52002 | 4/1980 | Japan .............................. 427/163 |
| 1134876 | 11/1968 | United Kingdom . | |

*Primary Examiner*—John H. Newsome
*Attorney, Agent, or Firm*—Richard S. Roberts

[57] ABSTRACT

A polarizer having increased hydrolytic stability is produced by impregnating a polyvinyl alcohol film with an iodine containing composition and then subjecting the substrate to both concentrated infrared and ultraviolet radiation treatments.

13 Claims, No Drawings

HYDROLYTICALLY STABILIZED POLARIZER

BACKGROUND OF THE INVENTION

The present invention relates to light polarizers or more particularly to light polarizers having increased hydrolytic stability.

U.S. Pat. No. 4,025,688 teaches the manufacture of light polarizers by providing a film of polyvinyl alcohol with a dichroic stain such as iodine. The polarizer may optionally be supported by a layer of cellulose acetate butyrate bonded to the polarizer through a hydrophilic tie coat.

A problem with this type of polarizer is it demonstrates poor hydrolytic stability. That is, its polarizing efficiency, or ability to polarize light, decreases over time as heat and humidity increases. This tendency is disadvantageous for such uses as in liquid crystal displays especially automobile instruments which must function in a wide range of heat and humidity conditions.

Czechoslovakian Pat. No. 122,408 discloses a process for stabilizing polarizing film by exposure to radiation at a wavelength of less than 400 nm for three hours.

Russian Pat. No. 124,116 stretches a polyvinyl alcohol film heats it and then places the film into an iodized solution containing hydrobromic acid and hydriodic acid with subsequent washing and drying. There is no subsequent heating.

SUMMARY OF THE INVENTION

The present invention provides a process for producing a hydrolytically stabilized polarizer which comprises staining a polyvinyl alcohol film in a bath of an iodine containing composition and subjecting said film to sources of both infrared and ultraviolet radiation in amounts sufficient to substantially increase the hydrolytic stability of the film. Said film is adhered to a support sheet either before or after such treatment steps.

The thusly produced polarizer demonstrates a high degree of polarizing efficiency over time even when subjected to relatively high heat and humidity conditions.

DETAILED DESCRIPTION OF THE PREFERRED EMBODIMENT

A polarizing element is made from two to three mil cast polyvinyl alcohol (PVA) film. This film is linearly stretched 300 to 500% by means of pull rolls and a heat source such as an oven, hot air knife or hot bar. In its stretched form the PVA film is preferably first joined to a substrate such as polyethylene terephthalate or cellulose acetate butyrate or other suitable substrate with an adhesive system to form a semi-laminate.

This semi-laminate is then run through an iodine bath where the iodine quickly diffuses into the PVA film and affixes to the thin, parallel molecules formed in the stretching operation. Excess iodine is washed away and the stained film is passed through a stabilizing solution typically comprising boric acid, which imparts chemical and moisture resistance to the stained surface by cross-linking the PVA. Excess stabilizing solution is washed off and the film is dried and coiled or sheeted.

While dry heat does not appreciably affect such polarizers, a combination of high heat and high humidity appreciably deteriorates the polarizing efficiency of the polarizer over time.

It has been found that hydrolytic stability can be increased up to about 20 times by subjecting the formed polarizer to both infrared and an ultraviolet radiation treatment.

In the preferred embodiment, a two to three mil cast polyvinyl alcohol film is uniaxially stretched while being heated so that the film is about 3 to 5 times its original length. The polyvinyl alcohol film is then preferably adhered to a clear substrate, preferably via lamination, by passing the substrate and the PVA film through the nip of a set of rollers while applying an adhesive, such as water, polyvinyl alcohol or polyurethane between the film and the substrate. Optionally, the support could be adhered to the PVA film after these treatments rather than before such treatments. Optionally the processed semi-laminate may be further laminated, at the polyvinyl alcohol interface, to a second substrate to form a full laminate structure.

One useful substrate is cellulose acetate butyrate. An especially advantageous substrate is comprised of polyester, particularly polyethylene terephthalate and especially a specially produced uniaxially stretched polyethylene terephthalate. Biaxially stretched polyethylene terephthalate can also be so used for some applications.

It has been a problem in the art to produce a clear, thermoplastic film substrate which is tough, chemically resistant and which is useful for optically critical purposes such as a support or cover for a liquid crystal display.

This problem is substantially overcome by producing a polyester film by the process of:
 (a) extruding a moving molten web of polyester film; and
 (b) quenching the moving web to solidify it in a substantially amorphous form; and
 (c) stretching the moving web in a direction transverse to the direction of motion while heating the web at a temperature of from about its glass transition temperature to about 160° C.; and
 (d) crystalizing the moving web by heating it to a temperature in the range of 130° C. to 240° C. under tension but without stretching said web; and
 (e) cooling said web to substantially ambient atmospheric temperature.

The polyester film may optionally be applied with a coating of a dispersed aqueous composition comprising polyvinyl alcohol or polyurethane usually prior to stretching.

The important feature of the produced film substrate is that it has a very low extinction angle. Extinction is the condition exhibited by a crystal when its optic axial plane is aligned with one of a pair of crossed polaroids. The extinction angle is the angle through which a crystal is revolved from a definite line (as that of the crystallographic axis) to the plane of maximum extinction. For a birefringent film, the extinction angle is the inclination of the optic axial plane to the transverse stretch direction. The extinction angle of the present film is to be as close to zero as possible. The angle may range from 0° to 6°, preferably 0° to 3° and most preferably 0°.

The process of producing this polyester film is more fully described in U.S. patent application, Ser. No. 262,669, filed May 11, 1981, which is incorporated herein by reference.

The semi-laminate is then stained by running it through an iodine bath, which also contains an iodide salt such as potassium iodide, and then through a stabilizing boronic treatment such as an aqueous solution of borax and boric acid as is well known in the art.

The thusly formed polarizer is then subjected to both a concentrated infrared heat treatment and a concentrated ultraviolet light treatment to substantially increase its hydrolytic stability over time. Typically, the polarizer is passed over two 800 watt infrared heaters and passed once or twice under a 300 watt per lineal inch focused mercury vapor lamp. The intensity and duration of these treatments may be varied by the skilled artisan according to the requirements of his specific application.

In the preferred embodiment, the staining bath is aqueous and contains sufficient iodine to impart the desired stain to the polyvinyl alcohol film. Typically this amount ranges from about 0.1% to 2% by weight of the solution. The bath also contains an iodide salt, such as potassium, sodium, lithium or hydrogen iodide which promotes the acceptance of the colored iodine stain into the polyvinyl alcohol. The iodide salt may be present in an amount of from about 1% to about the saturation point of the solution. A more preferred range is from about 10% to about 25%. The optimum quantity can be determined by the skilled artisan. One preferred quantity is about 21% potassium iodide. Preferably the solution may be maintained at a temperature of from about 95° F. to about 105° F. One may optionally include other ingredients in the staining bath, such as alcohols, to promote staining.

The stained film may next be introduced into a boronic stabilizing bath such as is well known in the art. A typical stabilizing bath contains an aqueous solution of 5% borax and 15% boric acid. A typical dwell time is about 90 seconds. The film may then be dried by air or in an oven. The thusly prepared film is hydrolytically stabilized by being subjected to exposure to both sources of infrared and ultraviolet radiation.

A typical infrared treatment consists of passing the film at a line speed of about 5 feet per minute under two 800 watt heaters spaced 5 inches apart. Each is parabolically reflected at a 2 ¾ inch focal length to produce an exposure line approximately one inch wide. Exposure is completed in less than one minute, or more typically from about 5 to 15 seconds. Obviously the exact parameters may be determined by the skilled artisan for his most advantageous use.

A typical ultraviolet treatment consists of passing the film at a line speed of about 5 feet per minute under a parabolically reflected high pressure mercury vapor lamp having discrete emissions in the UV range. Such an arrangement may have a 5 inch focal length and generate a ¾ inch exposure line across the entire width of a polarizer web at an output of 300 watts per lineal inch of web width. Again exposure is completed in less than one minute or more, typically from about 5 to 15 seconds. The exact parameters may also be determined by the skilled artisan for his most advantageous use.

The following non-limiting example is illustrative of the operation of the invention.

EXAMPLE

A sheet of two mil polyvinyl alcohol film is linearly stretched 360%. A sheet of polyethylene terephthalate is likewise cast, coated with an aqueous solution of polyvinyl alcohol and stretched transversely to its direction of motion while being heated at about 105° C. with subsequent crystallization and cooling. The two films are pressed together through the nip of a pair of rollers while water is applied between the films. This laminate is then dipped through a staining bath containing an aqueous solution of 21% potassium iodide and 0.4% iodine. The stained laminate is then introduced into an aqueous stabilizing bath containing 5% borax and 15% boric acid for a 90 second dwell time with subsequent drying. The thusly produced film is then passed, at a line speed of 5 feet per minute under two parabolically reflected 800 watt infrared heaters spaced 5 inches apart. The focal length is 2 ¾ inches and produces an exposure line one inch wide. The film is then passed under a parabolically reflected high pressure mercury vapor lamp having an output of 300 watts per lineal inch of web with a ¾ inch exposure line. The result is a polarized sheet having a relatively high degree of hydrolytic stability as compared to a non-irradiated polarized sheet.

What is claimed is:

1. A process for producing a hydrolytically stabilized polarizer which comprises staining a polyvinyl alcohol film in a bath of an iodine containing composition and subjecting said film to concentrated sources of infrared and ultraviolet radiation, each of said radiation treatments being conducted for a period of time less than about one minute and in amounts sufficient to substantially increase the hydrolytic stability of the film.

2. The process of claim 1 wherein said film is adhered to a support sheet either before or after said treatments.

3. The process of claim 2 wherein said support sheet comprises a polyester.

4. The process of claim 3 wherein said polyester support sheet comprises polyethylene terephthalate.

5. The process of claim 4 wherein said polyethylene terephthalate has been uniaxially stretched.

6. The process of claim 5 wherein said polyethylene terephthalate has been transversely uniaxially stretched.

7. The process of claim 2 wherein said support sheet comprises cellulose acetate butyrate.

8. The process of claim 2 wherein said polyvinyl alcohol film is laminated to said support sheet.

9. The process of claim 3 wherein said polyester support is coated with a composition comprising polyvinyl alcohol or polyurethane and said support is adhered to said film via said coating.

10. The process of claim 9 wherein an adhesion promoting agent is disposed between said polyvinyl alcohol film and said support sheet.

11. The process of claim 1 wherein said film is subjected to a boronic stabilizing treatment prior to irradiation.

12. The process of claim 1 wherein said film is dried prior to irradiation.

13. The process of claim 11 wherein said film is dried after boronic stabilizing but prior to irradiation.

* * * * *